UNITED STATES PATENT OFFICE.

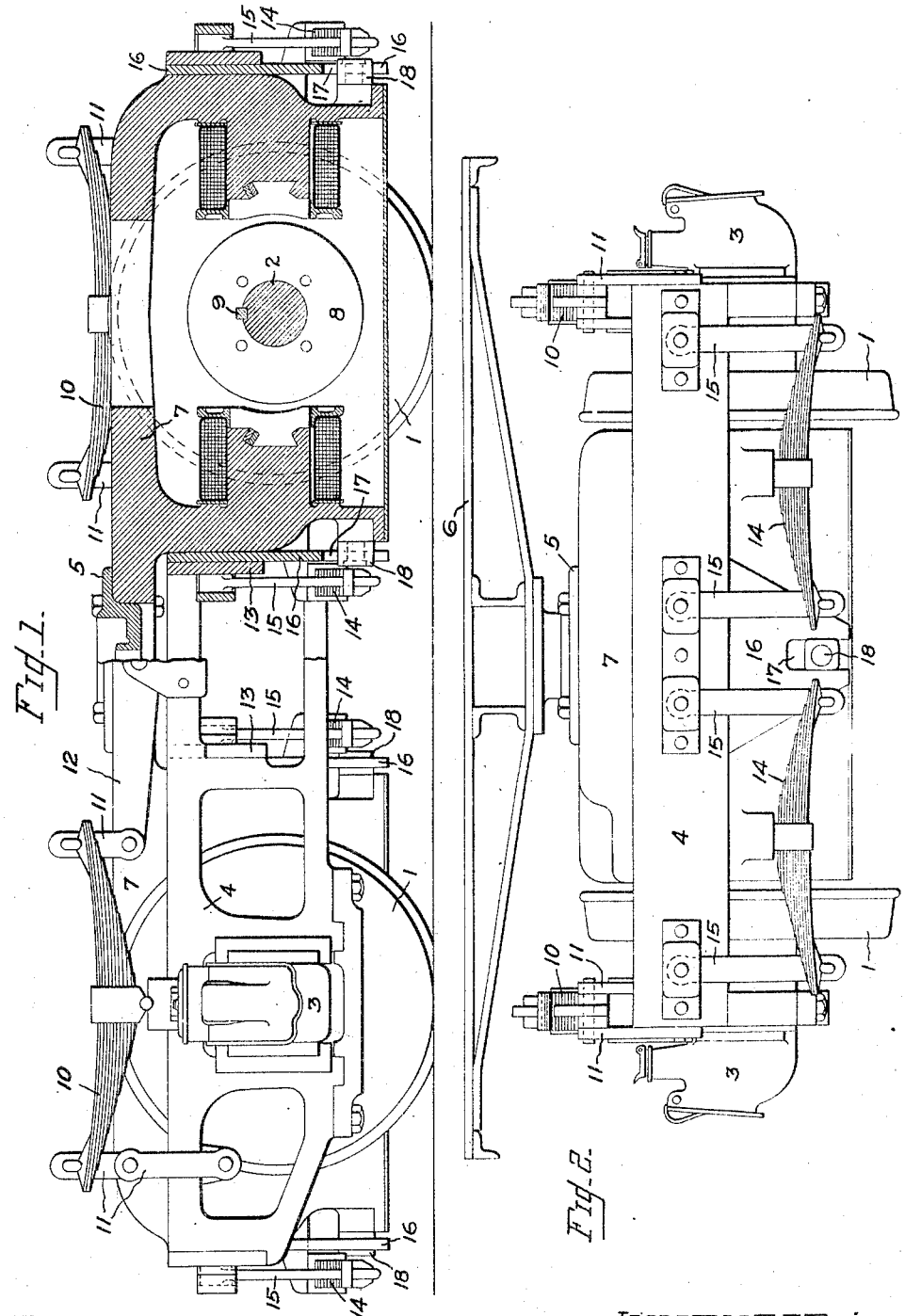

ASA F. BATCHELDER, OF SCHENECTADY, NEW YORK, ASSIGNOR TO GENERAL ELECTRIC COMPANY, A CORPORATION OF NEW YORK.

LOCOMOTIVE-TRUCK.

1,081,292.  Specification of Letters Patent.  Patented Dec. 16, 1913.

Application filed January 3, 1913. Serial No. 739,926.

*To all whom it may concern:*

Be it known that I, ASA F. BATCHELDER, a citizen of the United States, residing at Schenectady, county of Schenectady, State of New York, have invented certain new and useful Improvements in Locomotive-Trucks, of which the following is a specification.

My invention relates to locomotive trucks and is particularly applicable to trucks of electric locomotives.

When a locomotive is running on a track at high speed, there is a tendency for its wheels to go first to one side of the track and then to the other, setting up an oscillation in the locomotive which tends to deliver blows to the track. Steam locomotives as usually constructed have a high center of gravity, that is, the center of gravity of the spring-supported parts of the locomotive is located about three feet above the hubs of the wheels. When the flanges of the wheels of such a steam locomotive strike the rails, the point of impact of the spring-supported mass is at the hubs of the wheels or three feet below the center of gravity of the mass, and therefore, this mass has a tendency to roll over or to oscillate about this point and thus lessen the blows of its wheels on the track; or, in other words, the locomotive distributes its blows on the track over a longer stretch of track. Electric locomotives as usually constructed, however, have a low center of gravity, and my invention has for its object a novel construction of a locomotive truck whereby the same rolling effect can be obtained in a locomotive having a low center of gravity, as in a steam locomotive having a high center of gravity, and in which the point of impact of the spring supported mass of the locomotive when it oscillates is considerably below the center of gravity of this mass. To this end, I spring support the parts of the locomotive on which the platform is supported on the truck frame and also pivot these parts thereon about an axis disposed longitudinally of the truck.

Other features of novelty which characterize my invention are pointed out with particularity in the claims annexed to and forming a part of this specification.

For a better understanding of my invention, reference may be had to the following description taken in connection with the accompanying drawing, in which—

Figure 1 is a side view partly in section of a truck of an electric locomotive embodying my invention; and Fig. 2 is an end view of the truck of Fig. 1.

Referring to the drawing, the truck is shown as provided with two pairs of wheels 1, the axles 2 of which are journaled in journal boxes 3. These journal boxes are slidably mounted for a limited vertical movement in a truck frame 4, in the well known manner. The truck frame is supported upon the journal boxes 3 by a spring system of suspension of any well known form. A member 5, on which a platform 6 of a locomotive is supported, is spring supported on the truck frame and is narrower in its transverse dimension than the same dimension of the truck. It is pivoted on the truck frame about an axis disposed longitudinally of the truck whereby this member is adapted to swing or roll transversely of the truck. Preferably this member 5 comprises field or magnet portions 7 of electric motors, the armatures 8 of which surround the axles 2 and are mechanically connected thereto, as by keys 9. The center of gravity of the member 5 comprising the magnet portions of the motors, together with the platform or platforms on which the cab is mounted, the cab, and the usual control apparatus within the cab, will be approximately four feet above the rails, while the axis about which these parts are pivoted on the truck frame will be about ten inches above the rails, and therefore the center of gravity of these spring supported parts will be approximately three feet above the axis about which they are pivoted. With this construction, therefore, the point of impact of the spring supported mass of the locomotive upon its oscillation is therefore approximately three feet below the center of gravity of this mass.

I have shown my invention embodied in a swivel truck in which the truck frame 4 is supported upon the journal boxes 3, through a spring system of suspension comprising springs 10, links 11, and an equalizing lever 12, in accordance with my Patent No. 919,305, dated April 27, 1909. The motor frames or magnet portions 7 are spring supported from the end of truck frame 4 and from transoms 13 extending across the middle of the truck frame through a spring system of suspension comprising springs 14 and links 15, as clearly seen in Fig. 2 of the drawing. Substantially in the middle of the ends of the truck frame 4 and the transoms 13 are fastened projecting plates or members 16 which are provided with slots 17, into which extend projections 18 of the magnet frames of the motors. The magnet frames of the motors are narrower in their transverse dimension than the distance between the wheels, and by thus pivoting them upon an axis disposed longitudinally of the truck, the cab, platform, control apparatus and the magnet portions of the motors will be cushioned by their rolling or swinging about these trunnions or projections 18.

My invention is particularly applicable to the trucks of a locomotive built in accordance with my Patent No. 1,026,552, dated May 14, 1912, and may be embodied in all of the trucks of such a locomotive. I desire it to be understood, however, that my invention is not limited to the particular construction shown and described, and I aim in the appended claims to cover all modifications thereof which do not depart from the spirit and scope of my invention.

What I claim as new and desire to secure by Letters Patent of the United States, is:—

1. In a locomotive truck, a truck frame, axles, journal boxes for said axles slidably mounted in said truck frame, said truck frame being spring supported on said journal boxes, a platform, a member on which said platform is supported, said member being spring supported on said truck frame, and means for pivoting said member on said truck frame about an axis disposed longitudinally of said truck.

2. In a locomotive truck, a truck frame, axles, journal boxes for said axles slidably mounted in said truck frame, said truck frame being spring supported on said journal boxes, a platform, a member on which said platform is supported, said member being spring supported on said truck frame, and a pivotal connection between said member and said truck for pivoting said member about an axis disposed longitudinally of said truck.

3. In a locomotive truck, a truck frame, axles, journal boxes for said axles slidably mounted in said truck frame, said truck frame being spring supported on said journal boxes, a platform, a member on which said platform is supported, said member being spring supported on said truck frame and having a projecting portion, and a member projecting from said truck frame and engaged by the projecting portion of the first mentioned member for pivoting said first mentioned member about an axis disposed longitudinally of said truck.

4. In a locomotive truck, a truck frame, axles, electric motors comprising armatures surrounding said axles and field portions, journal boxes for said axles slidably mounted in said truck frame, a system of spring suspension for supporting said truck frame on said journal boxes, a platform, a member on which said platform is supported comprising said field portions of the motors, a system of spring suspension for supporting said member on said truck frame, and means for pivoting said member on said truck frame about an axis disposed longitudinally of said truck.

5. In a locomotive truck, a truck frame, axles, electric motors comprising armatures surrounding said axles and field portions, journal boxes for said axles slidably mounted in said truck frame, a system of spring suspension for supporting said truck frame on said journal boxes, a platform, a member on which said platform is supported comprising said field portions of said motors, a system of spring suspension for supporting said member on said truck frame, and a pivotal connection between said member and said truck frame for pivoting said member about an axis disposed longitudinally of said truck.

6. In a locomotive truck, a truck frame, axles, electric motors comprising armatures surrounding said axles and field portions, journal boxes for said axles slidably mounted in said truck frame, a system of spring suspension for supporting said truck frame on said journal boxes, a platform, a member on which said platform is supported comprising said field portions of said motors, a system of spring suspension for supporting said member on said truck frame, said member having a projecting portion, and a member projecting from said truck frame and engaged by the projecting portion of the first mentioned member for pivoting said first mentioned member about an axis disposed longitudinally of said truck.

In witness whereof, I have hereunto set my hand this 2nd day of January, 1913.

ASA F. BATCHELDER.

Witnesses:
BENJAMIN B. HULL,
MARGARET E. WOOLLEY.

Copies of this patent may be obtained for five cents each, by addressing the "Commissioner of Patents, Washington, D. C."